US011316779B2

(12) United States Patent
Koshinuma

(10) Patent No.: US 11,316,779 B2
(45) Date of Patent: Apr. 26, 2022

(54) COMMUNICATION DEVICE AND COMMUNICATION SYSTEM

(71) Applicant: FUJITSU LIMITED, Kawasaki (JP)

(72) Inventor: Shotaro Koshinuma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 135 days.

(21) Appl. No.: 16/794,297

(22) Filed: Feb. 19, 2020

(65) Prior Publication Data
US 2020/0274792 A1 Aug. 27, 2020

(30) Foreign Application Priority Data

Feb. 27, 2019 (JP) .............................. JP2019-034012

(51) Int. Cl.
H04L 12/709 (2013.01)
H04L 12/939 (2013.01)
H04L 45/24 (2022.01)
H04L 49/55 (2022.01)

(52) U.S. Cl.
CPC .......... H04L 45/245 (2013.01); H04L 49/555 (2013.01); H04L 49/557 (2013.01)

(58) Field of Classification Search
CPC .... H04L 45/245; H04L 49/255; H04L 49/557
USPC ....................................................... 370/216
See application file for complete search history.

(56) References Cited

U.S. PATENT DOCUMENTS

2005/0243713 A1* 11/2005 Okuda .................... H04L 47/10
                                                        370/216
2014/0161132 A1*  6/2014 Tatsumi ................ H04L 49/557
                                                        370/401
2017/0310548 A1* 10/2017 Jailani ................ H04L 41/0806
2019/0379582 A1* 12/2019 Johnsen ................ H04L 45/245

FOREIGN PATENT DOCUMENTS

JP        2014-116767 A    6/2014

* cited by examiner

Primary Examiner — Faisal Choudhury
(74) Attorney, Agent, or Firm — Fujitsu Patent Center

(57) ABSTRACT

A communication device redundantly configured with another communication device includes: a first port configured to transmit a packet through a second communication line configuring link aggregation with a first communication line of the other communication device; a second port configured to transmit and receive a packet through a fourth communication line configuring link aggregation with a third communication line of the other communication device; a third port configured to transmit a packet to the other communication device through a fifth communication line; and a first processor configured to: transfer a packet received by the second port to the first port or the third port; detect a failure of the second communication line; detect a failure of the fifth communication line; and shut down the second port when detecting the failure of the second communication line and the failure of the fifth communication line.

6 Claims, 17 Drawing Sheets

COMMUNICATION DEVICE AND COMMUNICATION SYSTEM

CROSS-REFERENCE TO RELATED APPLICATION

This application is based upon and claims the benefit of priority of the prior Japanese Patent Application No. 2019-34012, filed on Feb. 27, 2019, the entire contents of which are incorporated herein by reference.

FIELD

The embodiment discussed herein is related to a communication device, a communication system, and a communication method.

BACKGROUND

There is a technology in which a set of layer 2 switches is redundantly configured, and a communication line of each layer 2 switch is configured as a multi-chassis link aggregation (MC-LAG).

Related art is disclosed in Japanese Laid-open Patent Publication No. 2014-116767.

SUMMARY

According to an aspect of the embodiments, a communication device redundantly configured with another communication device includes: a first port configured to transmit a packet through a second communication line configuring link aggregation with a first communication line of the other communication device; a second port configured to transmit and receive a packet through a fourth communication line configuring link aggregation with a third communication line of the other communication device; a third port configured to transmit a packet to the other communication device through a fifth communication line; and a first processor coupled to the first port, the second port and the third port and configured to: transfer a packet received by the second port to the first port or the third port; detect a failure of the second communication line; detect a failure of the fifth communication line; and shut down the second port when detecting the failure of the second communication line and the failure of the fifth communication line.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, in a case that a network is configured in which redundantly configured sets of the layer 2 switches are coupled in series over multiple stages, when the ports of the respective sets of the layer 2 switches are coupled in a cross-coupled manner, the large number of ports are required for coupling, so that the number of ports that may be used for other applications is reduced, and the degree of freedom in the network configuration is limited.

In contrast, when the ports of the respective sets of the layer 2 switches are coupled to each other by omitting the cross-coupling, the required number of ports decreases, but the redundancy of the communication line between the ports is reduced, so that there is a risk that the network becomes vulnerable to failure of the communication line. For this reason, it is difficult to reduce the number of ports used for the MC-LAG.

Therefore, a communication device, a communication system, and a communication method, capable of reducing the number of ports used for an MC-LAG may be provided.

(Example in which Cross-Coupling is Omitted from Coupling Between Ports of MC-LAG)

Figure 1:
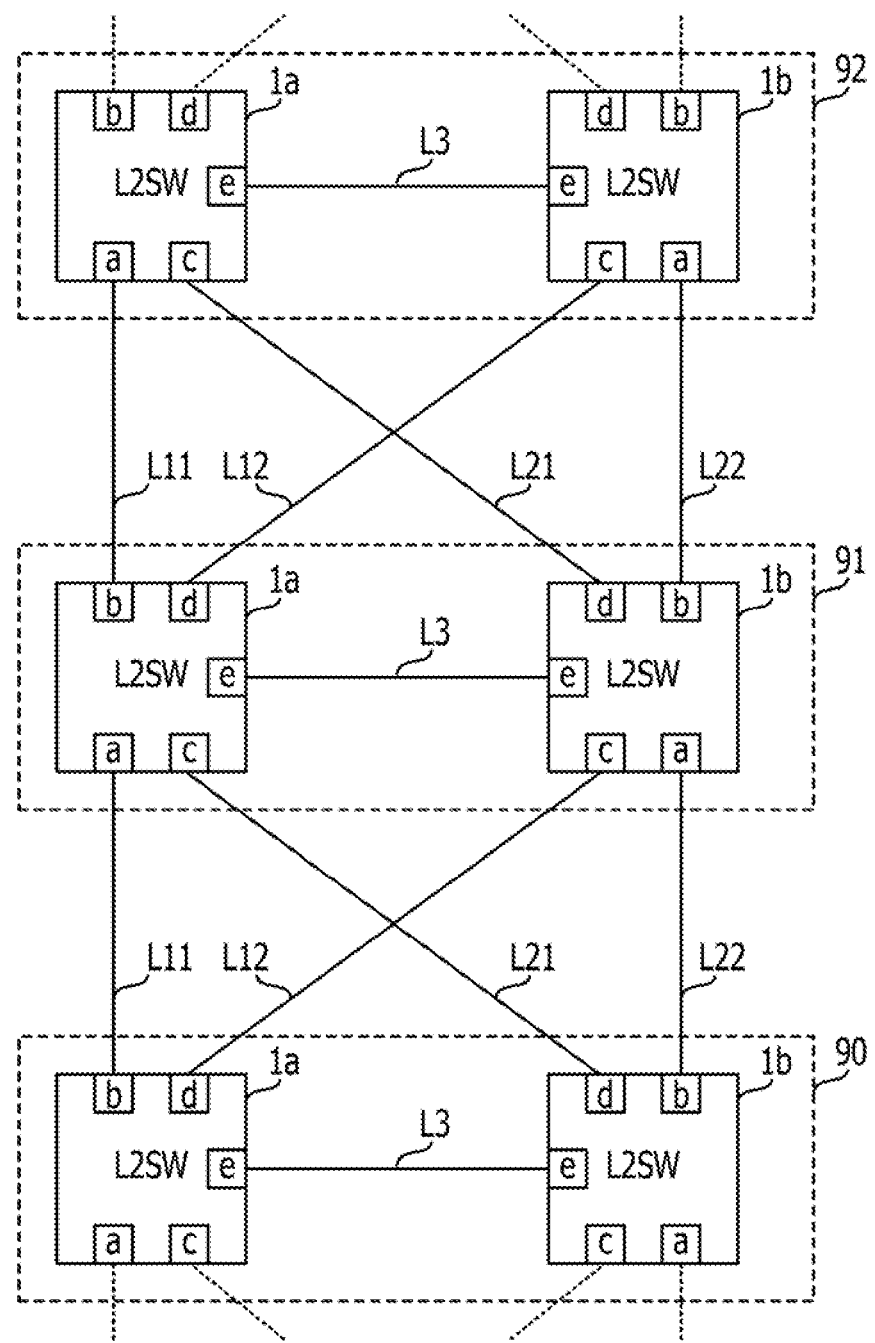
FIG. 1 is a configuration diagram illustrating an example of a network of layer 2 switches whose ports of an MC-LAG are coupled in a cross-coupled manner.

FIG. 1 is a configuration diagram illustrating an example of a network of layer 2 switches (L2SWs) 1a and 1b whose ports a to d of an MC-LAG are coupled in a cross-coupled manner. The layer 2 switches 1a and 1b of sets 90 to 92 are redundantly configured, and the ports a to d of the layer 2 switches 1a and 1b are coupled through communication lines L11, L12, L21, and L22 configuring the MC-LAG.

In the layer 2 switches 1a of the sets 90 to 92 which are adjacent to each other, the ports a and b are coupled to each other through the communication line L11.

In the sets 90 to 92 which are adjacent to each other, in the layer 2 switch 1a of one set and the layer 2 switch 1b of the other set, the ports c and d are coupled to each other through the communication line L12. The communication lines L11 and L12 configure the MC-LAG.

In the layer 2 switches 1b of the sets 90 to 92 which are adjacent to each other, the ports a and b are coupled to each other through the communication line L22.

In the sets 90 to 92 which are adjacent to each other, in the layer 2 switch 1a of one set and the layer 2 switch 1b of the other set, the ports c and d are coupled to each other through the communication line 121. The communication lines L21 and L22 configure the MC-LAG.

Ports e of the layer 2 switches 1a and 1b of each of the sets 90 to 92 are coupled to each other through a communication line L3. The communication line L3 is, for example, a line using an intra portal link (IPL) between the layer 2 switches 1a and 1b.

To the communication lines L11, L12, L21, and L22, a packet of a main signal is transmitted, whereas to the communication line L3, a control packet including control information is also transmitted in addition to the packet of the main signal in accordance with states of the layer 2 switches 1a and 1b.

In the following description, the communication lines L11, L12, L21, and L22 configuring the MC-LAG are each expressed as an "LAG line", and the communication line L3 using the IPL is expressed as an "IPL line".

When the ports a to d of the respective sets 90 to 92 of the layer 2 switches 1a and 1b are coupled in the cross-coupled manner as in this example, the large number of ports a to d are required for coupling, so that the number of ports that may be used for other applications is reduced and the degree of freedom in the network configuration is limited.

In contrast, when the ports a to d of the respective sets 90 to 92 of the layer 2 switches 1a and 1b are coupled to each other by omitting the cross-coupling, the required number of ports decreases.

Figure 2:
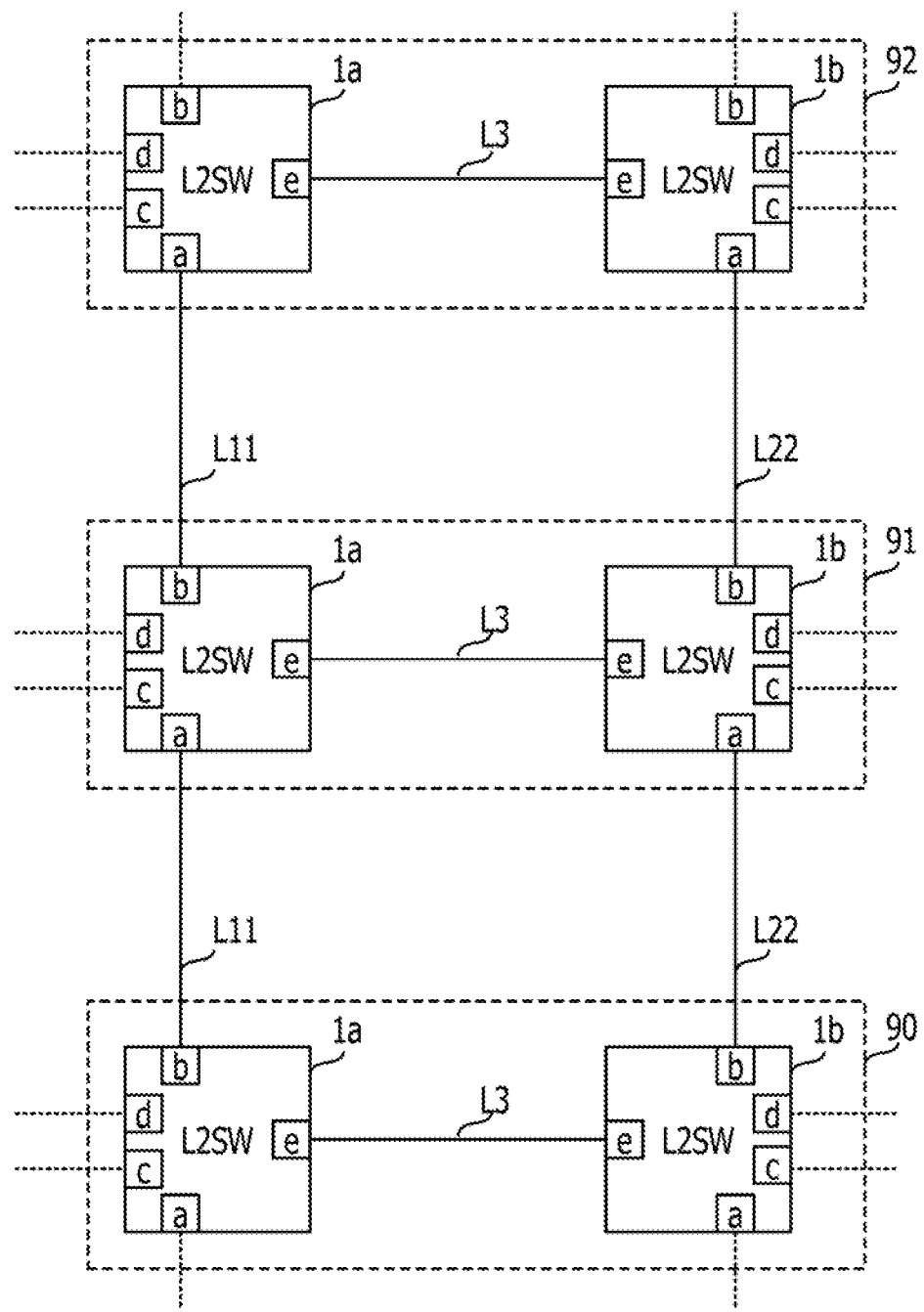
FIG. 2 is a configuration diagram illustrating an example of a network of layer 2 switches whose ports of the MC-LAG are coupled without cross-coupling.

FIG. 2 is a configuration diagram illustrating an example of a network of the layer 2 switches 1a and 1b whose ports a to d of the MC-LAG are coupled without the cross-coupling. In FIG. 2, constituents common to those in FIG. 1 are denoted by the same reference numerals, and description thereof is omitted.

The ports a to d of the layer 2 switches 1a and 1b of the sets 90 to 92 which are adjacent to each other are coupled without using the cross-coupling. That is, for example, the layer 2 switches 1a and 1b of the sets 90 to 92 which are adjacent to each other are coupled through only the communication lines L11 and L22 between the ports a and b. For this reason, the remaining ports c and d may be used for coupling to, for example, a user device or the like.

(Another Example in which Cross-Coupling is Omitted from Coupling Between Ports of MC-LAG)

Figure 3:
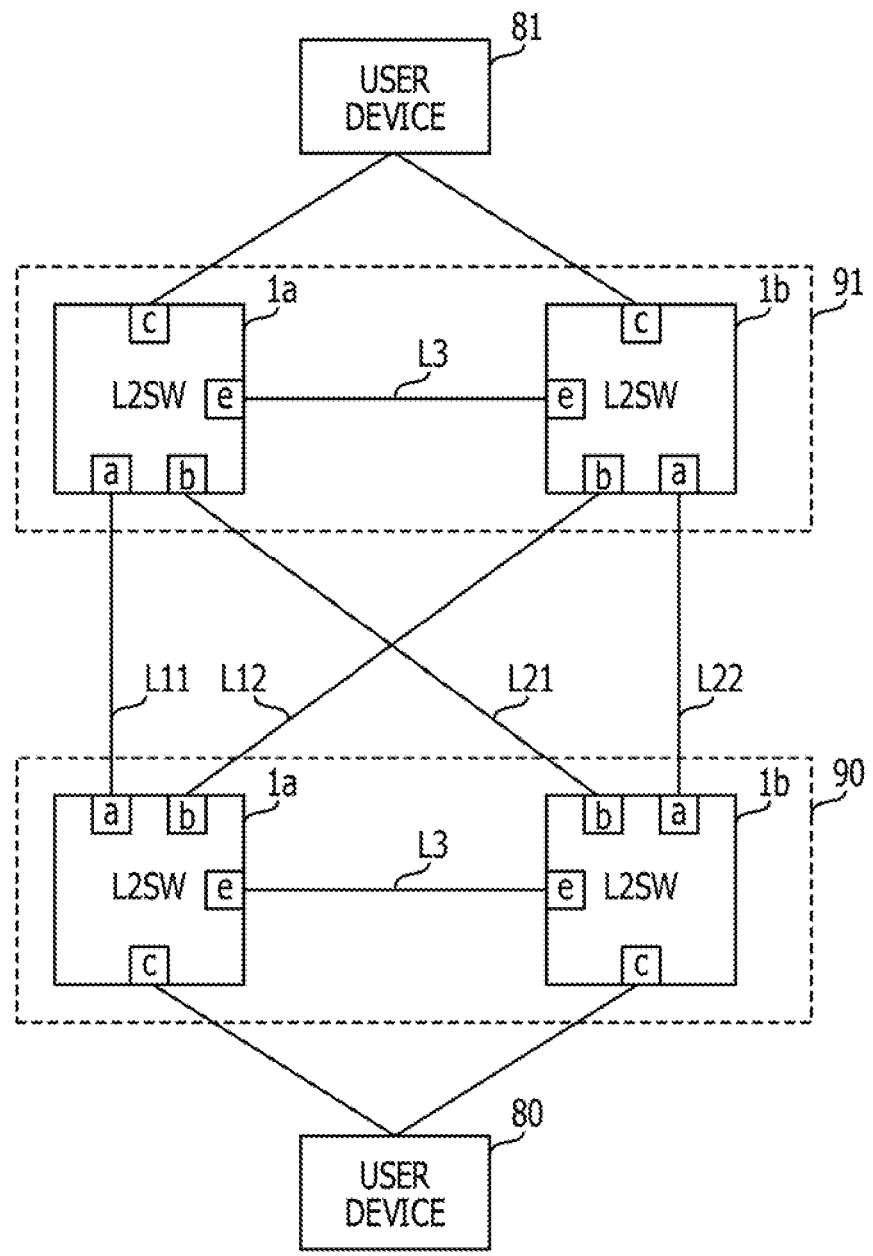
FIG. 3 is a configuration diagram illustrating another example of a network of layer 2 switches whose ports of the MC-LAG are coupled in a cross-coupled manner.

FIG. 3 is a configuration diagram illustrating another example of a network of the layer 2 switches 1a and 1b whose ports a and b of the MC-LAG are coupled in the cross-coupled manner. In FIG. 3, constituents common to those in FIG. 1 are denoted by the same reference numerals, and description thereof is omitted.

In the layer 2 switches 1a and 1b of the sets 90 and 91 which are adjacent to each other, the ports a are coupled to each other through the LAG line L11 or L22. In the layer 2 switch 1a of one set 90 or 91 and the layer 2 switch 1b of the other set 91 or 90, the ports b are coupled to each other through the LAG line L12 or L21. The LAG lines L11 and L22 configure the MC-LAG, and the LAG lines L12 and L21 configure the MC-LAG.

Each port c of the layer 2 switches 1a and 1b of the one set 90 is coupled to a user device 80, and each port c of the layer 2 switches 1a and 1b of the other set 91 is coupled to a user device 81. The user devices 80 and 81 may include, but is not limited to, a gateway device and the like. The user devices 80 and 81 communicate with each other through the layer 2 switches 1a and 1b of the respective sets 90 and 91.

Figure 4:
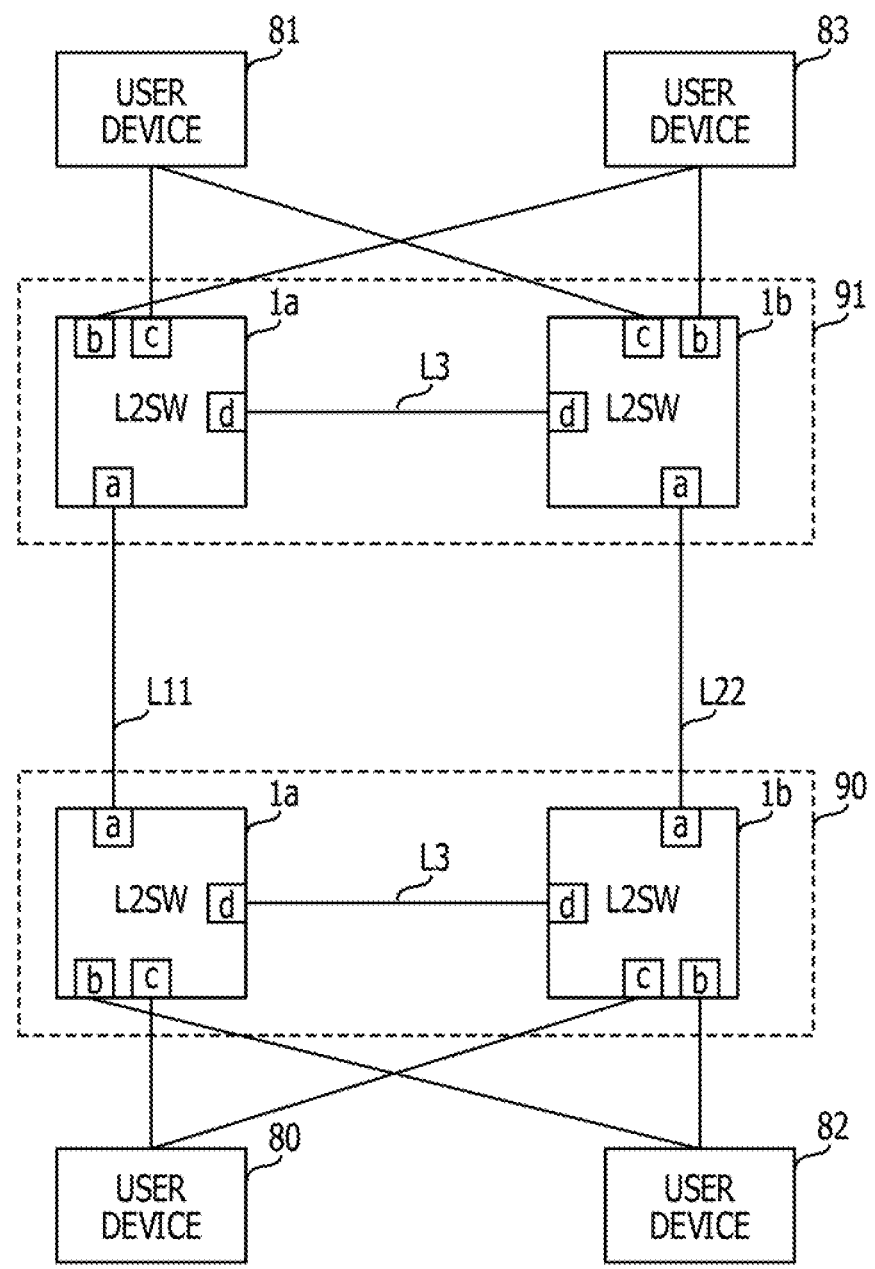
FIG. 4 is a configuration diagram illustrating another example of a network of layer 2 switches whose ports of the MC-LAG are coupled without cross-coupling.

FIG. 4 is a configuration diagram illustrating another example of a network of the layer 2 switches 1a and 1b whose ports a and b of the MC-LAG are coupled without the cross-coupling. In FIG. 4, constituents common to those in FIG. 3 are denoted by the same reference numerals, and description thereof is omitted.

As may be seen by comparing with FIG. 3, the coupling between the port b of the layer 2 switch 1b of the one set 90 and the port b of the layer 2 switch 1a of the other set 91 and the coupling between the port b of the layer 2 switch 1a of the one set 90 and the port b of the layer 2 switch 1b of the other set 91 are omitted. That is, for example, in the coupling of the layer 2 switches 1a and 1b of this example, the LAG lines L21 and L12 for the cross-coupling are omitted.

The port b of each of the layer 2 switches 1a and 1b which remains through this is used for coupling with other user devices 82 and 83. The ports b of the layer 2 switches 1a and 1b of the one set 90 are coupled to the user device 82, and the ports b of the layer 2 switches 1a and 1b of the other set 91 are coupled to the user device 83. Therefore, the layer 2 switches 1a and 1b of each of the sets 90 and 91 and the user devices 80 to 83 may be coupled in a cross-coupled manner.

As described above, by omitting the cross-coupling between the ports a and b of the MC-LAG, it is possible to increase the number of ports that may be coupled to the user devices 80 to 83. Only part of the cross-coupling may be omitted as follows.

Figure 5:
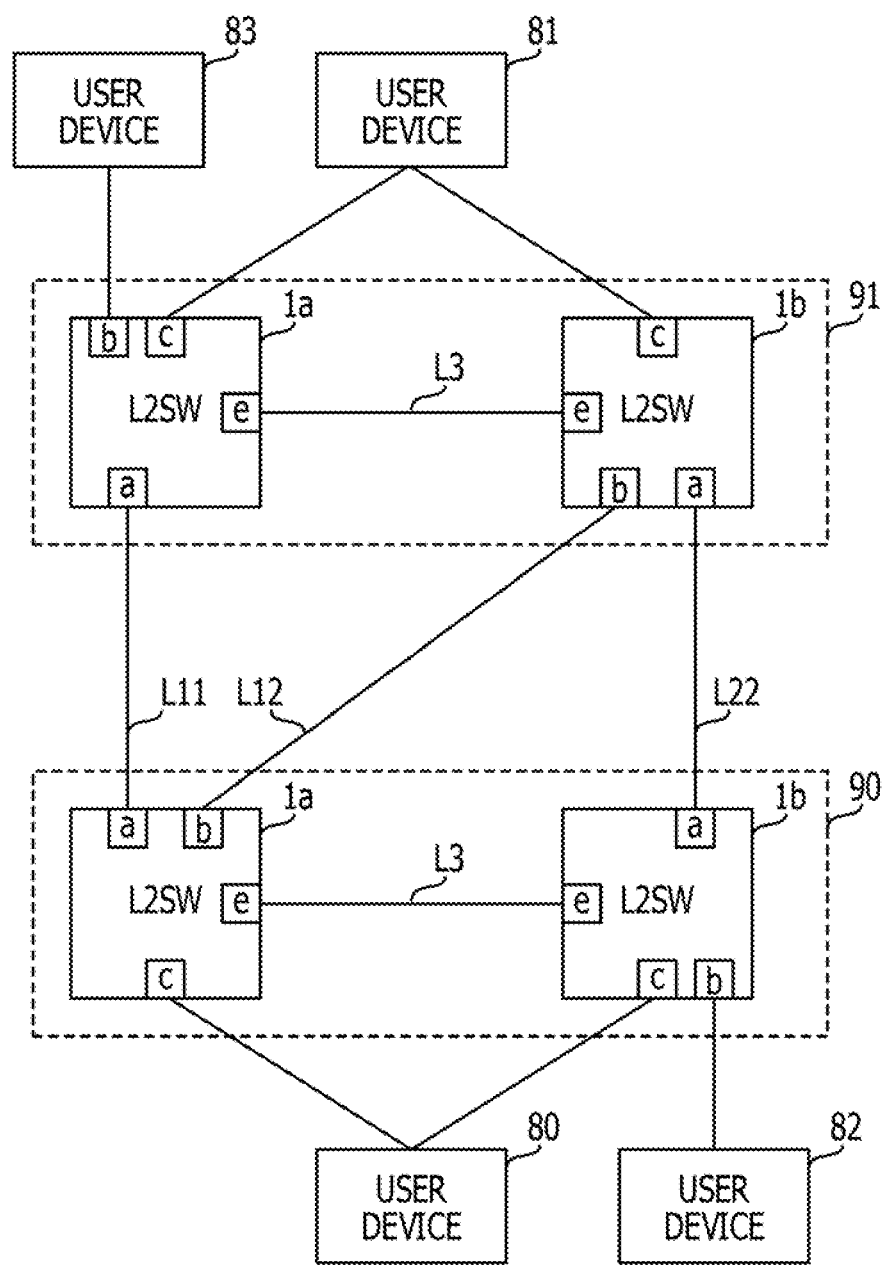
FIG. 5 is a configuration diagram illustrating an example of a network of layer 2 switches in which part of the cross-coupling between the ports of the MC-LAG is omitted.

FIG. 5 is a configuration diagram illustrating an example of a network of the layer 2 switches 1a and 1b in which part of the cross-coupling between the ports a and b of the MC-LAG is omitted. In FIG. 5, constituents common to those in FIG. 3 are denoted by the same reference numerals, and description thereof is omitted.

As may be seen by comparing with FIG. 3, the coupling between the port b of the layer 2 switch 1b of the one set 90 and the port b of the layer 2 switch 1a of the other set 91 is omitted. That is, for example, in the coupling of the layer 2 switches 1a and 1b of this example, the LAG line L21 configuring part of the cross-coupling is omitted.

The port b of each of the layer 2 switches 1a and 1b which remains through this is used for coupling with the other user devices 82 and 83. The port b of the layer 2 switch 1b of the one set 90 is coupled to the user device 82, and the port b of the layer 2 switch 1a of the other set 91 is coupled to the user device 83.

In this way, it is possible to increase the number of ports that may be coupled to the user devices 80 to 83 only by omitting part of the cross-coupling.

Figure 6:
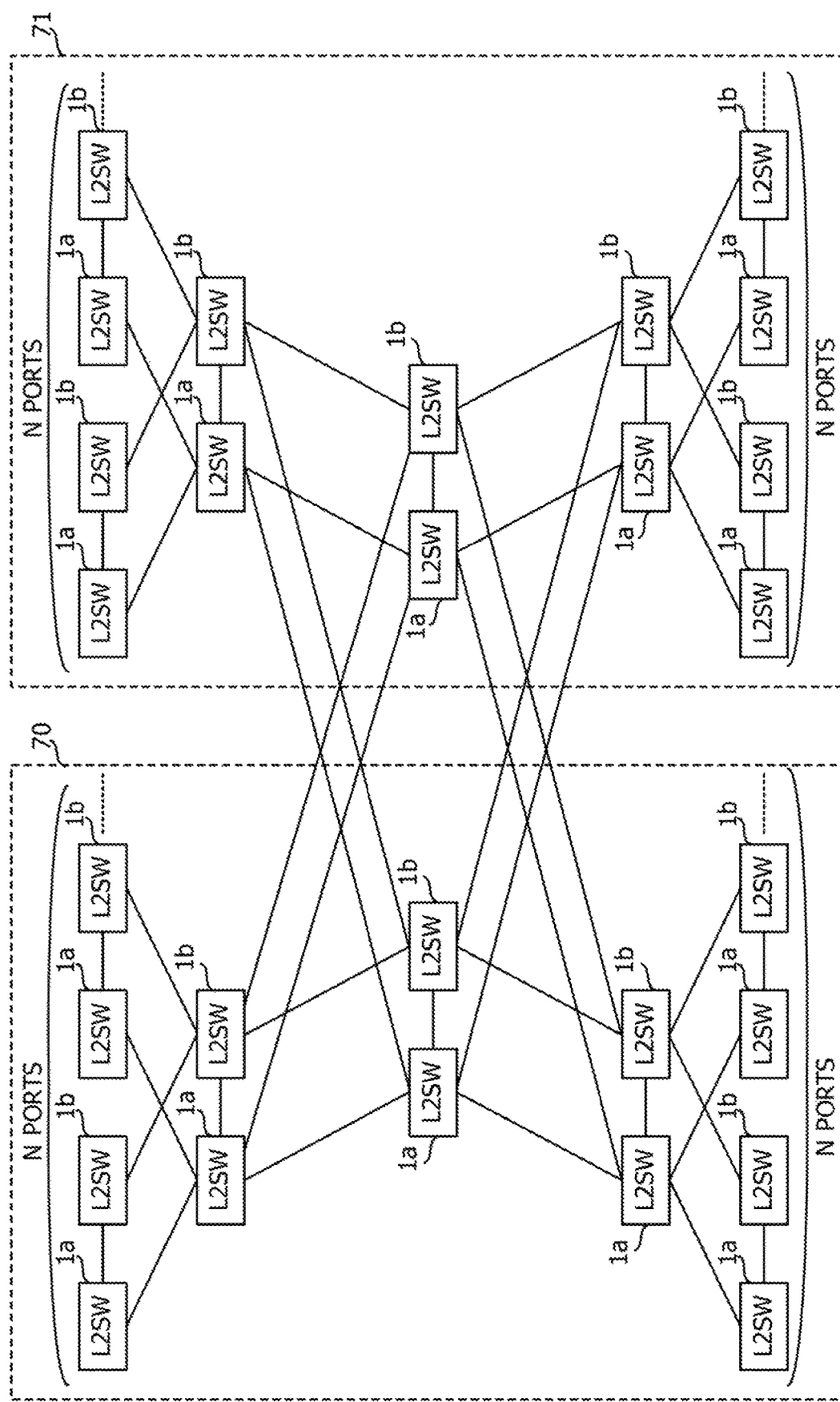
FIG. 6 is a configuration diagram illustrating an example of a virtual large-capacity switch in which redundantly configured sets of layer 2 switches are coupled in multistage.

FIG. 6 is a configuration diagram illustrating an example of a virtual large-capacity switch in which the redundantly configured sets of the layer 2 switches 1a and 1b are coupled in multistage. The virtual large-capacity switch includes switch groups 70 and 71 having the same configuration as each other. As described above, since the sets of the layer 2 switches 1a and 1b are coupled to each other without the cross-coupling, the number of available ports of the layer 2 switches 1a and 1b is increased, and it is possible for the sets of the layer 2 switches 1a and 1b in a middle stage of each of the switch groups 70 and 71 to be coupled to each other by the LAG line.

Therefore, it is possible to add a configuration within the dotted line frame to the virtual large-capacity switch without increasing ports of the layer 2 switches 1a and 1b. When the number of ports in an upper stage and a lower stage of each of the switch groups 70 and 71 is assumed to be N (N: positive integer), the total number of ports of the virtual large-capacity switch is 4×N. In contrast, if the sets of the layer 2 switches 1a and 1b are coupled to each other in the cross-coupled manner, since the virtual large-capacity switch may include only one of the switch groups 70 and 71, the total number of ports is 2×N. That is, for example, in the virtual large-capacity switch, by omitting the cross-coupling, the total number of ports may be doubled.

However, when the ports of the respective sets of the layer 2 switches 1a and 1b are coupled to each other by omitting the cross-coupling, the redundancy of the communication line between the ports is reduced, so that there is a risk that the network becomes vulnerable to failure of the communication line as described below.

(Operation in Failure Occurrence of LAG Line and IPL Line)

Figure 7:
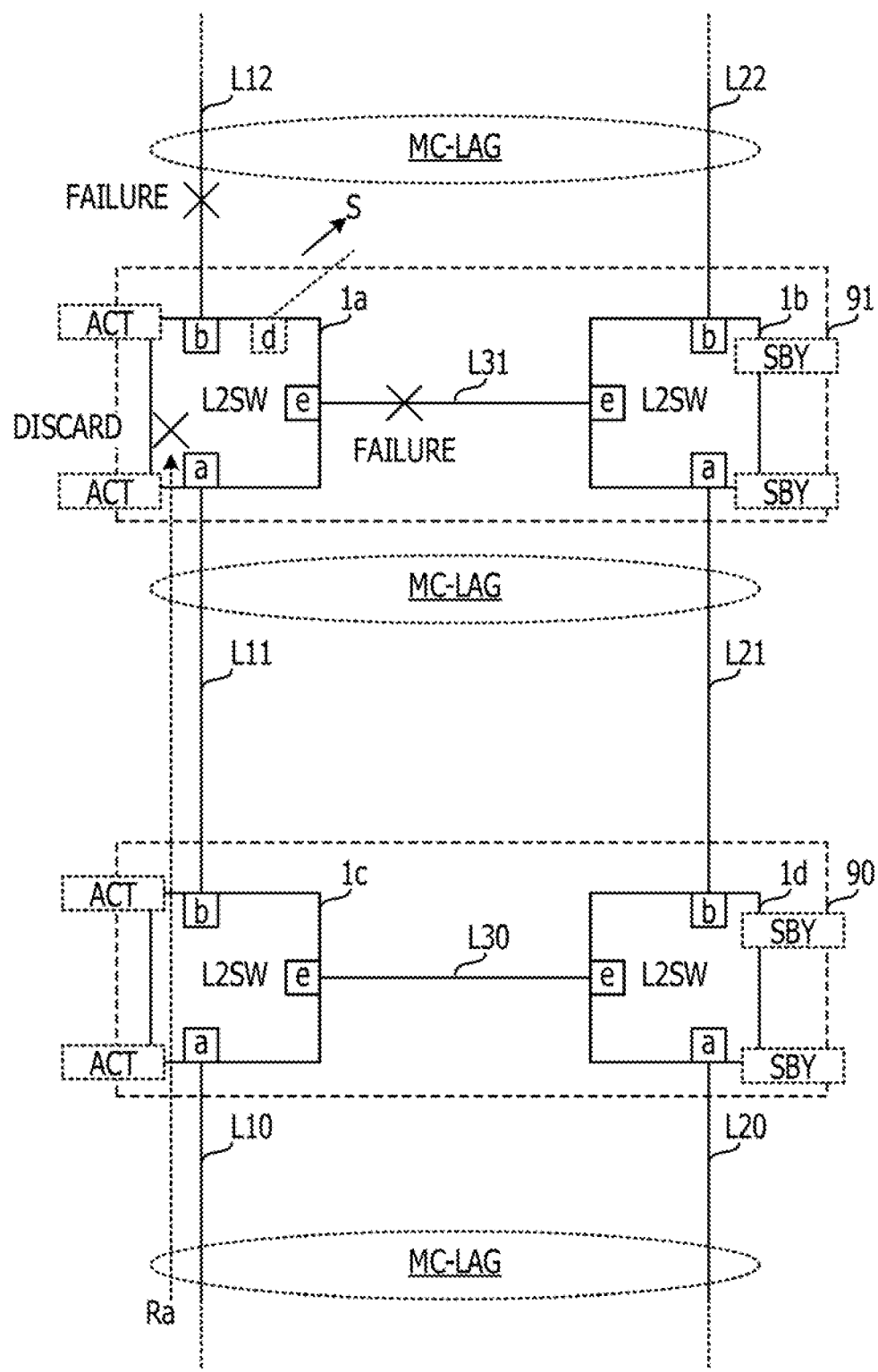
FIG. 7 is a diagram illustrating a comparative example of an operation when failures of an LAG line and an IPL line occur.

FIG. 7 is a diagram illustrating a comparative example of an operation when failures of the LAG line L11 and an IPL line 131 occur. FIG. 7 illustrates a communication system including the set 91 of the layer 2 switches 1a and 1b and the set 90 of the layer 2 switches 1c and 1d, as part of a network in which the redundantly configured sets of the layer 2 switches 1a and 1b are coupled in multistage without using the cross-coupling. The configurations of the layer 2 switches 1a to 1d are the same.

The port a of the layer 2 switch 1a and the port b of the layer 2 switch 1c are coupled to each other through the LAG line L11. The port b of the layer 2 switch 1d and the port a of the layer 2 switch 1b are coupled to each other through the LAG line L21. The LAG lines L11 and L21 configure the MC-LAG. The LAG line L11 is an example of a fourth communication line, and the LAG line L21 is an example of a third communication line.

The port b of the layer 2 switch 1a is coupled to another layer 2 switch through the LAG line L12, and the port b of the layer 2 switch 1b is coupled to another layer 2 switch through the LAG line L22. The LAG lines L12 and L22 configure the MC-LAG. The LAG line L22 is an example of a first communication line, and the LAG line L12 is an example of a second communication line.

The port a of the layer 2 switch 1c is coupled to another layer 2 switch through the LAG line L10, and the port a of the layer 2 switch 1d is coupled to another layer 2 switch through the LAG line L20. The LAG lines L10 and L20 configure the MC-LAG.

The ports e of the layer 2 switches 1a and 1b of the one set 91 are coupled to each other through the IPL line L31. The ports e of the layer 2 switches 1c and 1d of the other set 90 are coupled to each other through an IPL line L30. The IPL line L31 is an example of a fifth communication line, and the IPL line L30 is an example of a sixth communication line.

Each of the ports a and b of the layer 2 switches 1a to 1c transmits and receives a packet to and from a port to be coupled through the LAG lines L10 to L12 and L20 to L22. Each of the ports e of the layer 2 switches 1a to 1c transmits and receives a packet to and from the port e to be coupled through the IPL line L30 or L31. The packet includes, but not limited to, an Ethernet (registered trademark) frame, for example.

The ports a and b of the layer 2 switches 1a and 1c are set to an ACT state, and the ports a and b of the layer 2 switches 1b and 1d are set to an SBY state. Each of the layer 2 switches 1a to 1c transmits a packet from the ports a and b in the ACT state, but when a failure occurs in the LAG lines L10 to L12 of the ports a and b in the ACT state, transmits the packet to the other layer 2 switches 1b and 1d through the IPL lines L30 and L31. In this case, the layer 2 switches 1b and 1d transmit the packet from the ports a and b in the SBY state.

As an example, a case that a packet is transmitted along a path Ra will be described. The layer 2 switch 1c receives the packet at the port a and transmits the packet from the port b. The packet is input to the layer 2 switch 1a through the LAG line L11. The layer 2 switch 1a receives the packet at the port a.

At this time, it is assumed that failures occur in the LAG line L12 and the IPL line L31 of the layer 2 switch 1a (see X mark). Since it is not possible for the layer 2 switch 1a to transmit the packet to the LAG line L12 and the IPL line L31 in each of which the failure is occurring, the packet is discarded (see X mark).

Therefore, it is not possible for the layer 2 switch 1a to transmit the packet to a set of the layer 2 switches in a subsequent stage (not illustrated). If the layer 2 switches 1a and 1b are coupled to the layer 2 switches in the subsequent stage in the cross-coupled manner, the packet may be transmitted from the corresponding port d to the layer 2 switch in the subsequent stage (see reference numeral S).

Therefore, in the embodiment, by the layer 2 switch 1a shutting down the port a, the layer 2 switch 1c switches the path of the packet.

Figure 8:
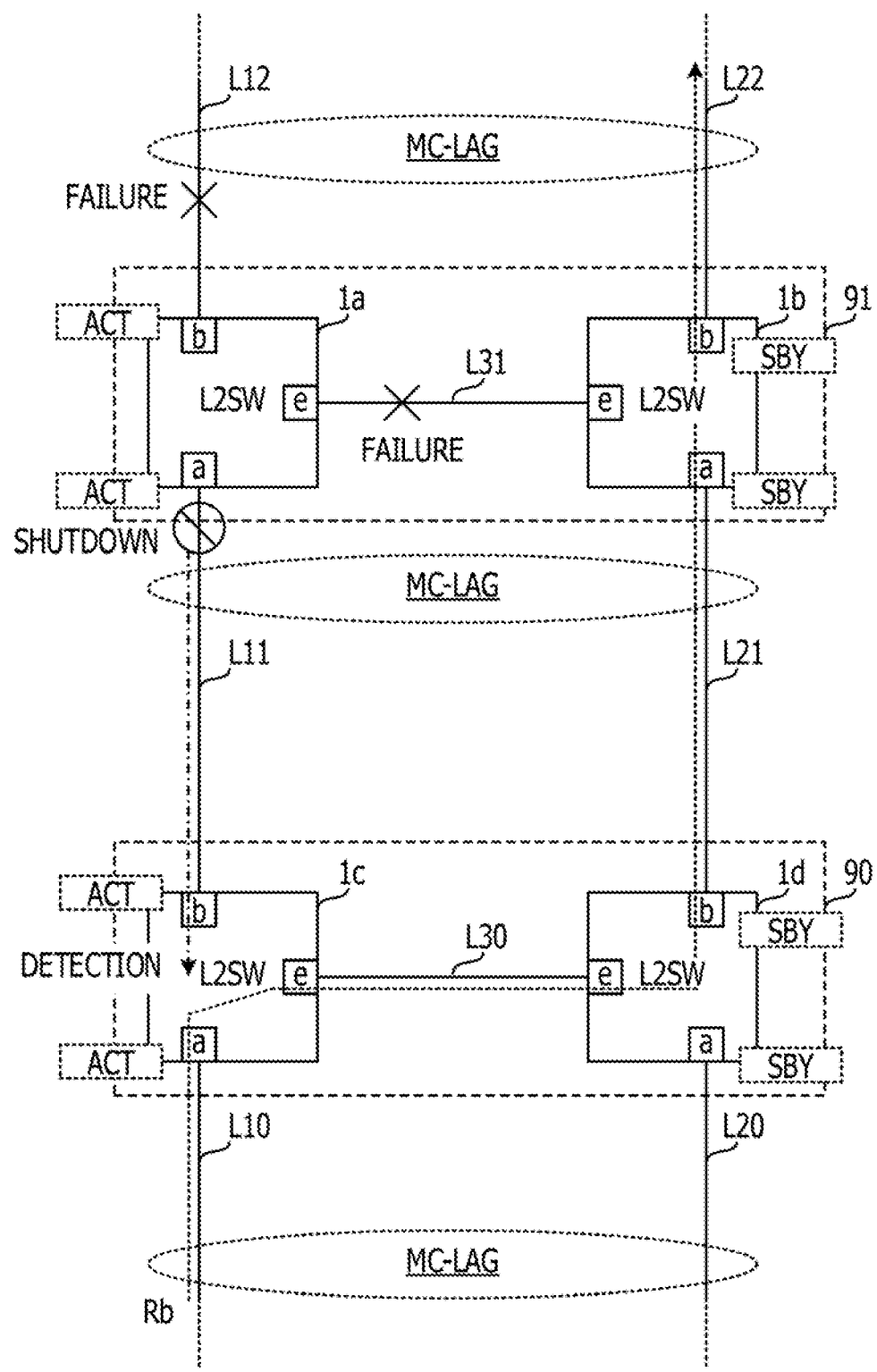
FIG. 8 is a diagram illustrating an embodiment of an operation when the failures of the LAG line and the IPL line occur.

FIG. 8 is a diagram illustrating an embodiment of an operation when the failures of the LAG line L11 and the IPL line L31 occur. When detecting the failures of the LAG line L12 and the IPL line L31 of the packet transmission destination, the layer 2 switch 1a shuts down the port a. The layer 2 switch 1c detects the shutdown of the port a of the layer 2 switch 1a (see dot-dash line).

When detecting the shutdown of the port a of the layer 2 switch 1a, the layer 2 switch 1c transmits the packet received at the port a from the port e. As a result, the path of the packet is switched over.

The packet is transmitted along a path Rb. The packet is input to the layer 2 switch 1d through the IPL line L30. The layer 2 switch 1d transmits the packet received at the port e from the port b. The packet is input to the layer 2 switch 1b through the LAG line L22. Since the failure is occurring in the IPL line L31, the layer 2 switch 1b transmits the packet received at the port a from the port b.

With this operation, the packet is transmitted to the layer 2 switch in the subsequent stage of the layer 2 switches 1a and 1b while avoiding the LAG line L12 and the IPL line L31 in which the failures are occurring.

(Configuration of Layer 2 Switches 1a to 1d)

Next, the configuration of the layer 2 switches 1a to 1d will be described. Although the layer 2 switch 1a is described as an example in the following example, the other layer 2 switches 1b to 1d also have the same configuration as that of the communication device 1a. The layer 2 switches 1a to 1d are examples of first to fourth communication devices, respectively.

Figure 9:
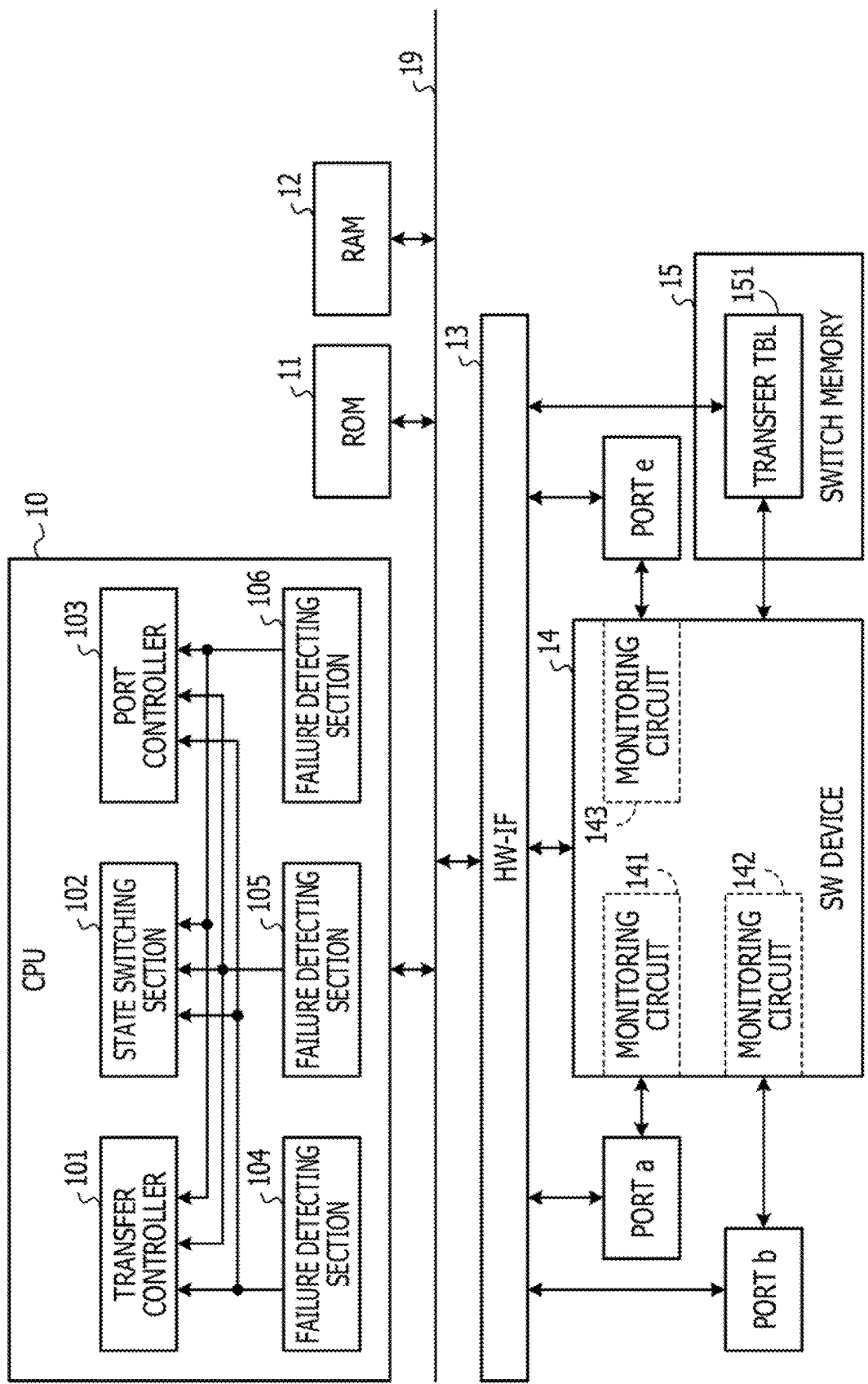
FIG. 9 is a configuration diagram illustrating an example of the layer 2 switch.

FIG. 9 is a configuration diagram illustrating an example of the layer 2 switch 1*a*. The layer 2 switch 1*a* includes a central processing unit (CPU) 10, a read-only memory (ROM) 11, a random-access memory (RAM) 12, a hardware interface section (HW-IF) 13, a switch (SW) device 14, a switch memory 15, and ports a, b, and e. The CPU 10 is coupled to the ROM 11, the RAM 12, and the HW-IF 13 through a bus 19 so as to enable mutual inputting/outputting of signals.

The ROM 11 stores a program for driving the CPU 10. The program includes software or the like for executing a communication method of the embodiment. The RAM 12 functions as a working memory for the CPU 10.

The HW-IF 13 processes communication between the CPU 10 and the switch device 14, the switch memory 15, the ports a and b, and the port e. The HW-IF 13 is a circuit configured of hardware such as a field-programmable gate array (FPGA), an application specified integrated circuit (ASIC), or the like, for example.

The ports a and b and the port e are each, for example, a local area network (LAN) port, and each include an optical transceiver (not illustrated) for transmitting and receiving a packet. The ports a and b correspond to the ports a and b, respectively, of each of the layer 2 switches 1*a* to 1*d* in FIG. 8. The ports a and b transmit and receive a packet of a main signal through the LAG lines L10 to L12 and L20 to 122.

The port e corresponds to the port e of each of the layer 2 switches 1*a* to 1*d* in FIG. 8. The port e transmits and receives not only the packet of the main signal but also a control packet for switching the ports a and b to the ACT state or the SBY state.

The ports b and a of the layer 2 switch 1*a* are examples of a first port and a second port (first and second transmission and reception ports), respectively, and the port e of the layer 2 switch 1*a* is an example of a third port (third transmission and reception port). The port b of the layer 2 switch 1*c* is an example of a fourth port, and the port e of the layer 2 switch 1*c* is an example of a fifth port. The port a of the layer 2 switch 1*b* is an example of a fifth transmission and reception port, the port e of the layer 2 switch 1*b* is an example of a sixth transmission and reception port, and the port b of the layer 2 switch 1*b* is an example of a fourth transmission and reception port.

The switch device 14 is coupled to the ports a and b and the port e. The switch device 14 includes monitoring circuits 141 to 143 for monitoring the state of communication of each of the ports a, b, and e, respectively. For example, the monitoring circuits 141 to 143 detect a bit error rate of the communication, interruption of input/output of light, and the like, and output an alarm.

The switch device 14 also exchanges the packet of the main signal among the ports a and b and the port e. The switch device 14 is a circuit configured of hardware such as the FPGA, the ASIC, or the like, for example.

When the packet is transferred along the path Ra illustrated in FIG. 7, the switch device 14 transfers the packet received by the port a to the port b, if no failure is occurring in the LAG line L12. For this reason, the packet is transferred from the LAG line L11 on a downstream side to the LAG line L12 on an upstream side.

Even if the failure is occurring in the LAG line L12, the switch device 14 transfers the packet received by the port a to the port e, if no failure is occurring in the IPL line L31. Therefore, the packet is transferred from the LAG line L11 on the downstream side to the IPL line L31. Thereafter, the layer 2 switch 1*b* transmits the packet received by the port e from the port b.

In this way, the switch device 14 of the layer 2 switch 1*a* transfers the packet received by the port a to the port b or the port e. The switch device 14 is an example of a transfer processing section, and the switch device 14 of the layer 2 switch 1*c* is an example of a packet output section.

To the switch device 14, the switch memory 15 in which a transfer table (TBL) 151 is stored is also coupled. The switch device 14 learns an address of the packet of the main signal, causes the transfer table 151 to store the address, and exchanges the packet among the ports a, b, and e based on the transfer table 151. In the transfer table 151, for example, the destination address of the packet of the main signal transmitted from each of the ports a, b, and e is registered.

The registered contents of the transfer table 151 are changed by the CPU 10. For example, in a case of the layer 2 switch 1*a*, since the transfer table 151 is changed according to the presence or absence of failures in the LAG lines L11 and L12 and the IPL line L31, the path Ra of the packet is switched to the path Rb as described above.

The switch device 14 transmits and receives the control packet to and from the layer 2 switch 1*b* through the port e. The switch device 14 outputs the received control packet to the CPU 10 through the HW-IF 13. On the other hand, the control packet to be transmitted is inputted from the CPU 10 to the switch device 14 through the HW-IF 13.

When the CPU 10 reads the program from the ROM 11, as a function, a transfer controller 101, a state switching section 102, a port controller 103, and a failure detecting sections 104 to 106 are formed.

The failure detecting section 104 is an example of a first detecting section and a first failure detecting section, and detects a failure in the LAG line L12 by collecting an alarm from the monitoring circuit 141. The failure detecting section 105 is an example of a second failure detecting section, and detects a failure in the LAG line L11 by collecting an alarm from the monitoring circuit 142. The failure detecting section 106 is an example of a second detecting section, and detects a failure in the IPL line L31 by collecting an alarm from the monitoring circuit 143. The failures of the LAG lines L11 and L12 and the IPL line L31 include interruption of an optical fiber and faults of the ports a, b, and e. For this reason, the failure detecting section 105 of the layer 2 switch 1*c* may also detect the shutdown of the port a of the layer 2 switch 1*a* as the failure.

The transfer controller 101 controls packet transfer of the switch device 14 in accordance with a failure detection result of the failure detecting sections 104 to 106. For example, the transfer controller 101 changes setting of the transfer table 151 in the switch device 14, thereby changing the ports a, b, and e of the transfer destination for each of the ports a, b, and e where the packet is received.

The state switching section 102 switches the state of each of the ports a and b to the ACT state or the SBY state in accordance with the failure detection result of the failure detecting sections 104 to 106. When the state of each of the ports a and b of the layer 2 switch 1*a* is switched, the state switching section 102 instructs the transfer controller 101 of transfer setting according to the ACT state or the SBY state.

When switching the state of each of the ports a and b of the layer 2 switch 1*b* on the partner side of the redundant configuration, the state switching section 102 generates a control packet and outputs the generated control packet to the switch device 14. In this case, the state switching section 102 of the layer 2 switch 1*b* switches the state of each of the ports a and b in accordance with the instruction included in the control packet received from the layer 2 switch 1*a* on the partner side of the redundant configuration.

The port controller 103 shuts down the ports a and b in accordance with the failure detection result of the failure detecting sections 104 to 106. In the operation example of FIG. 6, when the failure detecting sections 104 and 106 each detect the failure, the port controller 103 shuts down the port a.

The transfer controller 101, the state switching section 102, and the port controller 103 control the operation of the layer 2 switch 1a in cooperation with one another. The operation of the layer 2 switch 1a will be described below.

Figure 10:
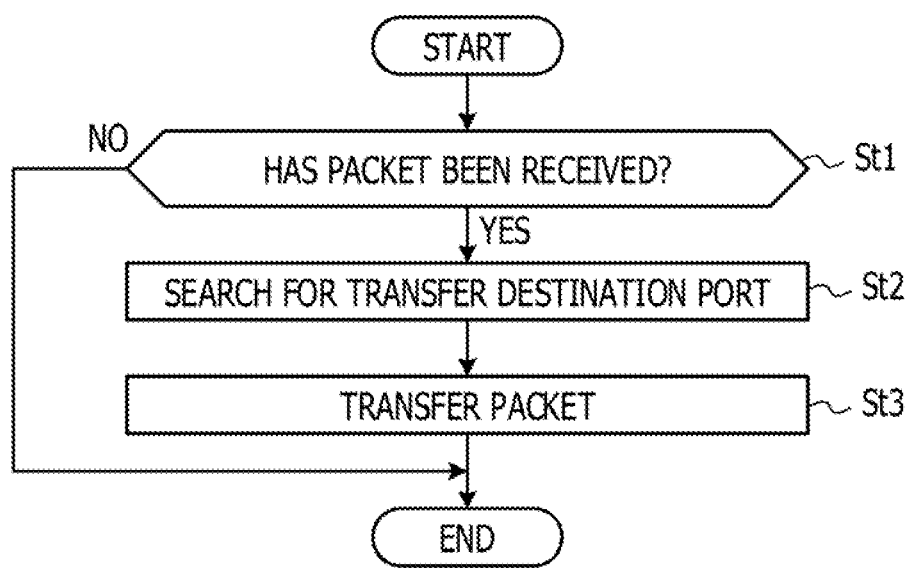
FIG. 10 is a flowchart illustrating an example of packet transfer processing performed by the layer 2 switch.

FIG. 10 is a flowchart illustrating an example of packet transfer processing performed by the layer 2 switch 1a. This process is repeatedly executed.

The switch device 14 determines whether or not any of the ports a, b, and e has received the packet of the main signal (step St1). When none of the ports a, b, and e has been received the packet (No in step St1), the process ends.

When any of the ports a, b, and e has received the packet of the main signal (Yes in step St1), the switch device 14 searches the transfer table 151 for a transfer destination port to which the packet is to be transmitted (step St2). Next, the switch device 14 transfers the packet to the ports a, b, and e retrieved as the transfer destination port (step St3). With this, the ports a, b, and e of the transfer destination transmit the packet. In this manner, the packet transfer processing is performed.

Figure 11:
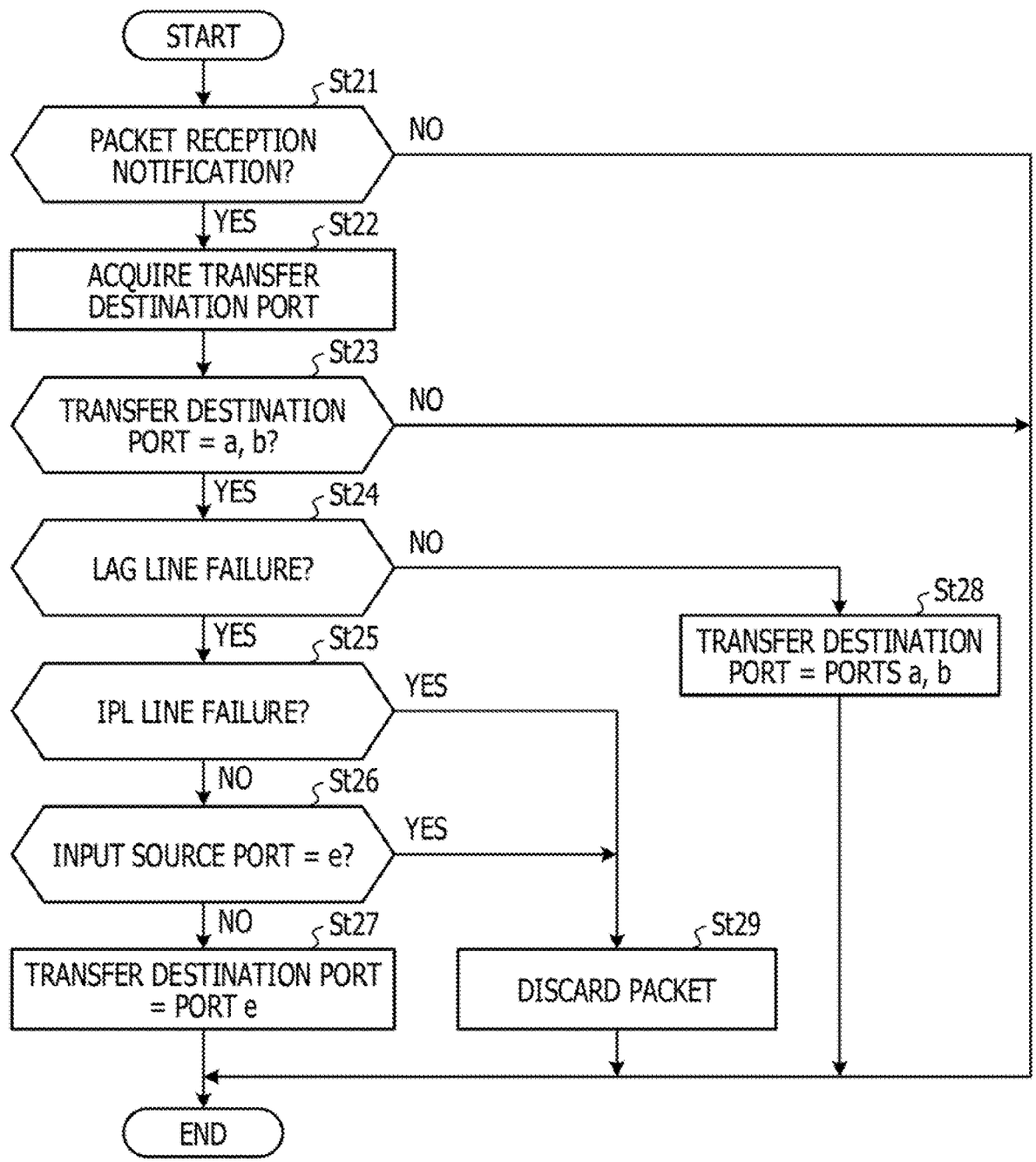
FIG. 11 is a flowchart illustrating an example of transfer control processing performed by a transfer controller.

FIG. 11 is a flowchart illustrating an example of transfer control processing performed by the transfer controller 101. This process is repeatedly executed.

The transfer controller 101 determines the presence or absence of a packet reception notification from the ports a, b, and e (step St21). When there is no packet reception notification (No in step St21), the transfer controller 101 terminates the processing.

When receiving the packet reception notification (Yes in step St21), the transfer controller 101 acquires information of the transfer destination port from the switch device 14 (step St22). The switch device 14 retrieves the transfer destination port from the transfer table 151.

The transfer controller 101 determines whether or not the transfer destination port is the port a or the port b (step St23). When the transfer destination port is the port e (No in step St23), the transfer controller 101 terminates the processing.

In a case that the transfer destination port is the port a or the port b (Yes in step St23), the transfer controller 101 determines the presence or absence of failures in the LAG lines L11 and L12 corresponding to the ports a and b based on the detection result of the failure detecting sections 104 and 105 (step St24). When there is no failure in the LAG lines L11 and L12 (No in step St24), the transfer controller 101 instructs the switch device 14 to set the transfer destination port to the ports a and b (step St28), and terminates the processing.

Therefore, for example, when no failure occurs in the LAG line L12, the switch device 14 of the layer 2 switch 1a transfers the packet received by the port a to the port b, and transmits the packet to the LAG line L12 from the port b. When no failure occurs in the LAG line L11, the switch device 14 of the layer 2 switch 1c transfers the packet received by the port a to the port b, and transmits the packet to the LAG line L11 from the port b.

When the failures of the LAG lines L11 and L12 occur (Yes in step St24), the transfer controller 101 determines the presence or absence of the failure in the IPL line L31 based on the detection result of the failure detecting section 106 (step St25). When the failure occurs in the IPL line L31 (Yes in step St25), since there is no communication line capable of transmitting the packet, the transfer controller 101 instructs the switch device 14 to discard the packet (step St29), and terminates the processing.

When there is no failure in the IPL line L31 (No in step St25), the transfer controller 101 determines whether or not an input source port is the port e based on the packet reception notification (step St26). When the input source port is the port e (Yes in step St26), since there is no communication line capable of transmitting the packet, the transfer controller 101 instructs the switch device 14 to discard the packet (step St29), and terminates the processing.

When the input source port is the port a or the port b (No in step St26), the transfer controller 101 instructs the switch device 14 to set the transfer destination port to the port e (step St27), and terminates the processing.

Therefore, for example, when a failure occurs in the LAG line L12 and no failure occurs in the IPL line L31, the switch device 14 of the layer 2 switch 1a transfers the packet received by the port a to the port e, and transmits the packet to the IPL line L31 from the port e. When a failure occurs in the LAG line L11 and no failure occurs in the IPL line L30, the switch device 14 of the layer 2 switch 1c transfers the packet received by the port a to the port e, and transmits the packet to the IPL line L30 from the port e.

Accordingly, as described with reference to FIG. 8, when the layer 2 switch 1a on the upstream side shuts down the port a, the layer 2 switch 1c may transmit the packet received by the port a from the port e to the layer 2 switch 1d on the partner side of the redundant configuration through the IPL line L30. In this manner, the transfer controller 101 performs the transfer control processing.

According to this transfer control processing, when the failure detecting section 104 does not detect a failure of the LAG line L12, the switch device 14 of the layer 2 switch 1a transfers the packet received by the port a to the port b. When the failure detecting section 104 detects a failure of the LAG line L12 and the failure detecting section 106 does not detect a failure of the IPL line L31, the switch device 14 transfers the packet received by the port a to the port e.

Therefore, even if a failure occurs in the LAG line L12 of the packet transmission destination, the layer 2 switch 1a may transfer the packet to the layer 2 switch 1c on the partner side of the redundant configuration through the IPL line 131. Accordingly, the packet is transmitted to the layer 2 switch on the upstream side from the layer 2 switch 1c.

Figure 12:
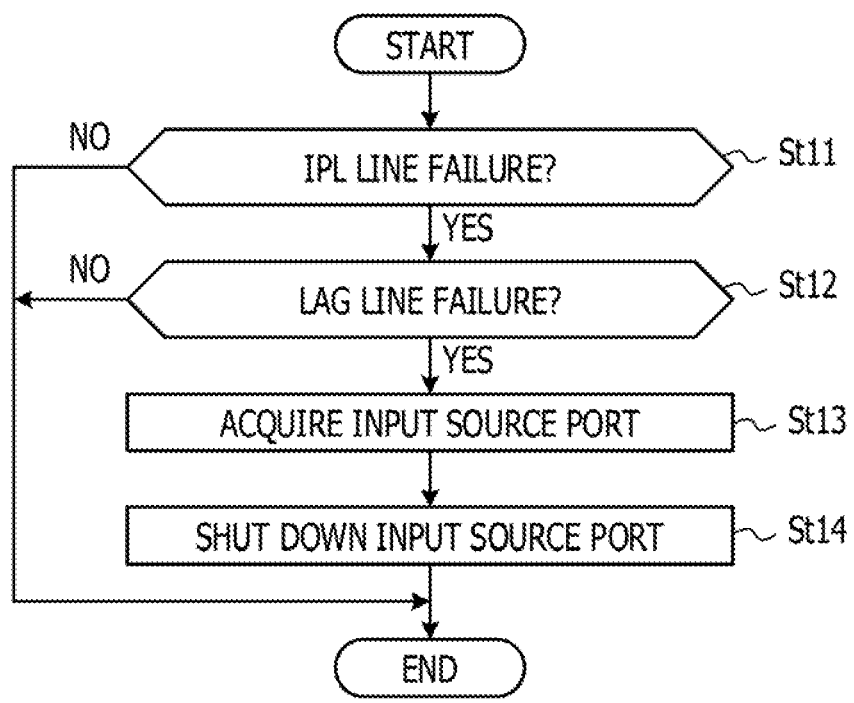
FIG. 12 is a flowchart illustrating an example of control processing performed by a port controller.

FIG. 12 is a flowchart illustrating an example of control processing performed by the port controller 103. The port controller 103 determines the presence or absence of a failure in the IPL line L31 based on the detection result of the failure detecting section 106 (step St11). When there is no failure in the IPL line L31 (No in step St11), since there is a communication line of the packet transmission destination, the port controller 103 terminates the processing.

When the failure of the IPL line L31 occurs (Yes in step St11), the port controller 103 determines the presence or absence of the failures in the LAG lines L11 and L12 based on the detection result of the failure detecting sections 104 and 105 (step St12). When there are no failures in the LAG lines 111 and L12 (No in step St12), since there is a communication line of the packet transmission destination, the port controller 103 terminates the processing.

When the failures occur in the LAG lines L11 and L12 (Yes in step St12), the port controller 103 acquires the information of the input source port which uses the ports a and b corresponding to the LAG lines L11 and L12 in which the failures are occurring as the transfer destination ports, from the switch device 14 (step St13).

Next, the port controller 103 shuts down the input source port (step St14). In this manner, the port controller 103 performs the control processing.

According to this control processing, as described with reference to FIG. 8, the port controller 103 of the layer 2 switch 1a shuts down the port b when the failure detecting sections 104 and 105 detect the failures of the LAG lines L12 and L11, respectively.

When the failure detecting section 104 does not detect the shutdown of the port a of the layer 2 switch 1a on the upstream side, the switch device 14 of the layer 2 switch 1c on the downstream side outputs the packet to the port b. When the failure detecting section 104 detects the shutdown of the port a of the layer 2 switch 1a on the upstream side, the switch device 14 outputs the packet to the port e. The failure detecting section 104 of the layer 2 switch 1c is an example of a shutdown detecting section.

As described above, the layer 2 switch 1d receives the packet from the layer 2 switch 1c through the IPL line L30, and transfers the packet to the layer 2 switch 1b through the LAG line L21. The layer 2 switch 1b receives the packet from the layer 2 switch 1d through the IPL line L20, and transfers the packet to the LAG line L22.

Accordingly, since the layer 2 switches 1a to 1d transmit the packet along the path Rb, even if the failures occur in the LAG line L12 and the IPL line L31 at the same time, the communication may continue.

(Operation in Failure Occurrence of LAG Lines on Upstream Side and Downstream Side)

Figure 13:
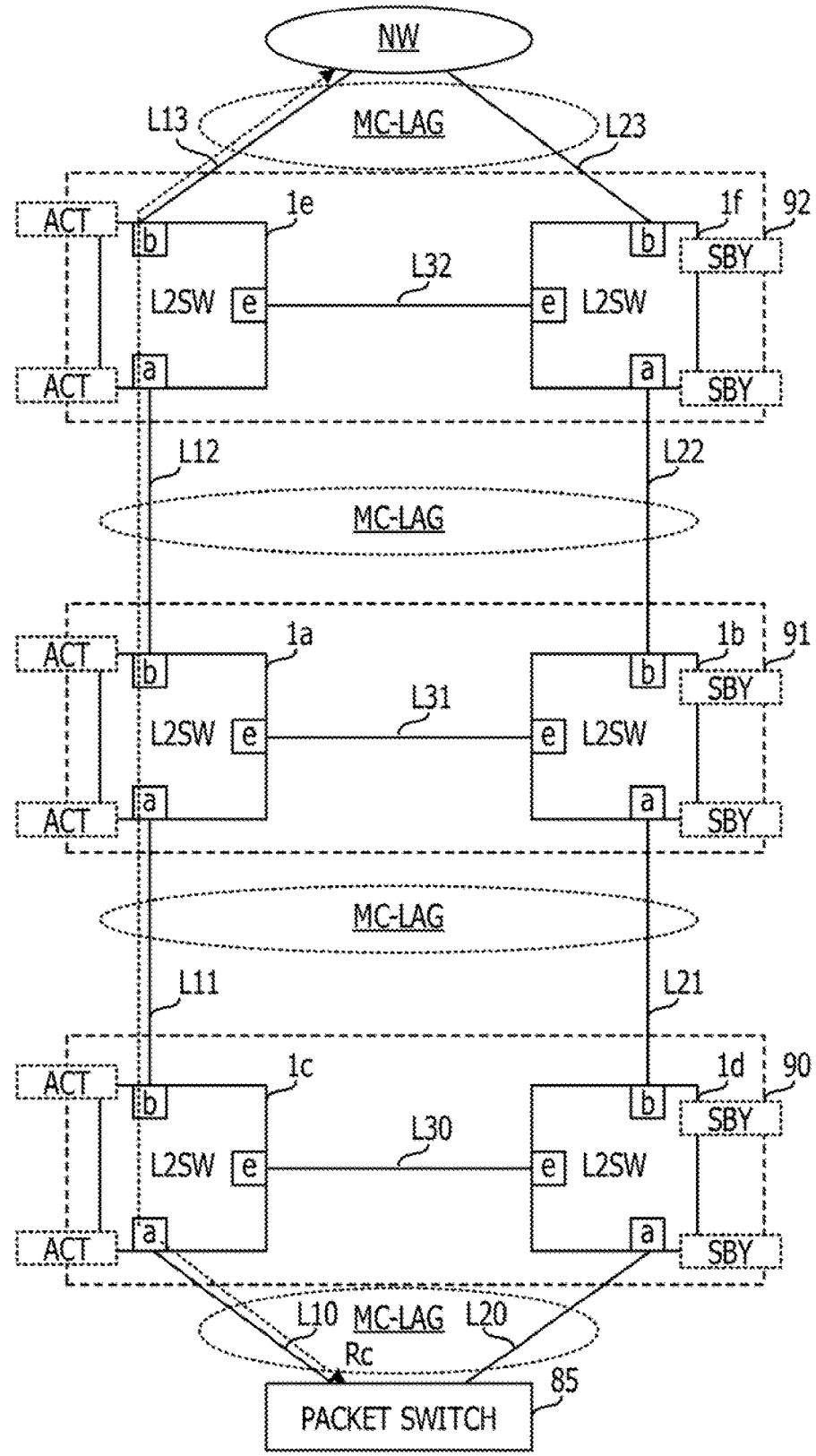
FIG. 13 is a diagram illustrating an example of an operation of the layer 2 switch in a case that the failure of the LAG line does not occur.

FIG. 13 is a diagram illustrating an example of operations of the layer 2 switches 1a to 1f in a case that no failure occurs in the LAG lines L10 to L13 and L20 to L23. In FIG. 13, constituents common to those in FIG. 8 are denoted by the same reference numerals, and description thereof is omitted.

The communication system of this example includes the layer 2 switches 1a to 1f and a packet switch 85. The ports a of the layer 2 switches 1c and 1d are coupled to the packet switch 85 through the LAG lines L10 and L20, respectively. The packet switch 85 transmits and receives a packet to and from a transfer network NW through the LAG lines L10 and L20.

The set 91 of the layer 2 switches 1a and 1b is coupled to the other set 92 of the layer 2 switches 1e and 1f. The port b of the layer 2 switch 1a is coupled to the port a of the layer 2 switch 1e through the LAG line L12, and the port b of the layer 2 switch 1b is coupled to the port a of the layer 2 switch 1f through the LAG line L22.

The ports b of the layer 2 switches 1e and 1f are coupled to the transfer network NW including a router or the like through the LAG lines L13 and L23 configuring the MC-LAG, respectively.

The ports a and b of the layer 2 switches 1a, 1c, and 1e are set to the ACT state, and the ports a and b of the layer 2 switches 1b, 1d, and 1f are set to the SBY state. The LAG lines L10 to L13 corresponding to the ports a and b in the ACT state are working lines, and the LAG lines L20 to L23 corresponding to the ports a and b in the SBY state are spare lines. Therefore, the packet switch 85 transmits and receives the packet to and from the transfer network NW in accordance with a path Rc via the LAG lines L10 to L13 of the ports a and b of the layer 2 switches 1a, 1c, and 1e.

Figure 14:
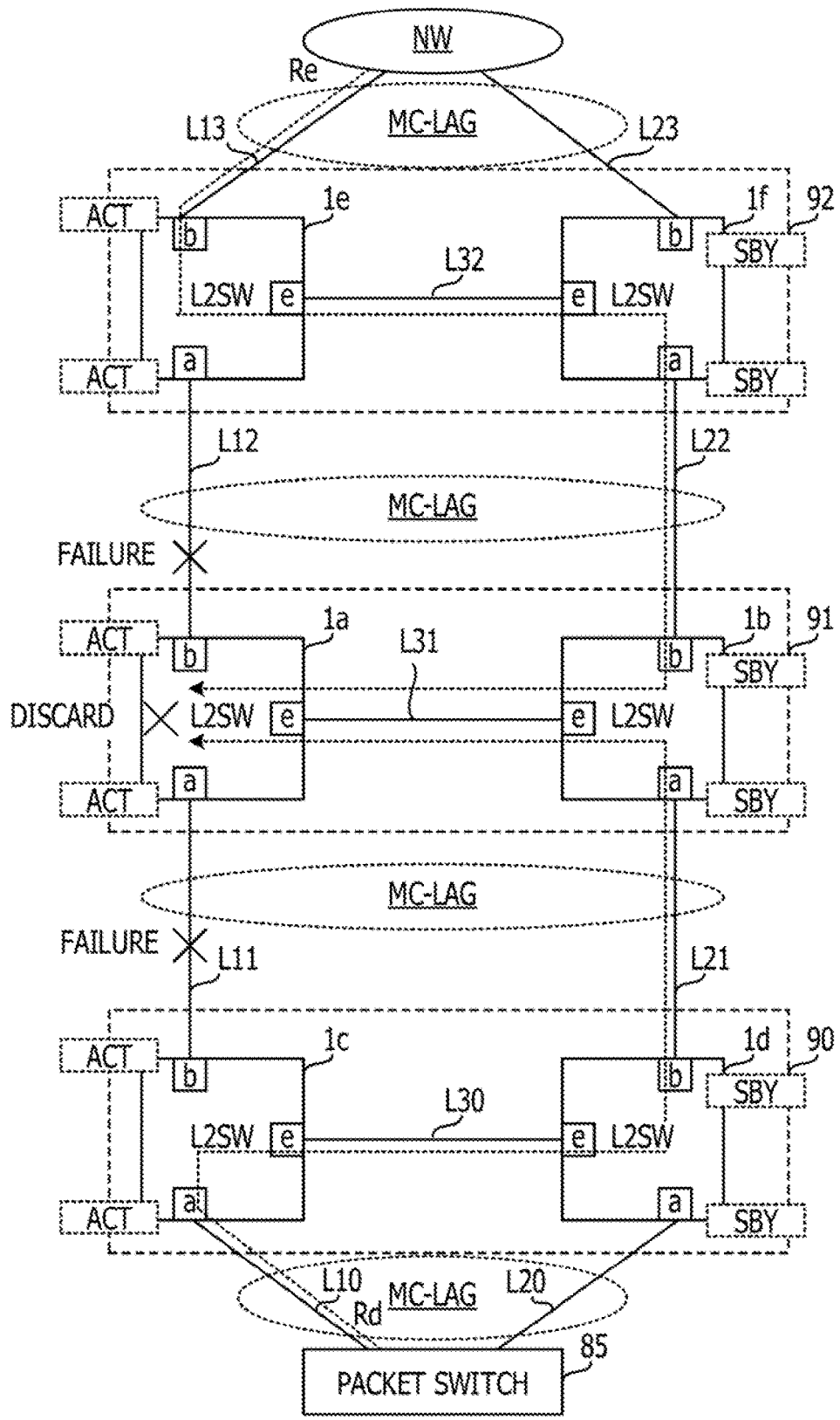
FIG. 14 is a diagram illustrating a comparative example of an operation of the layer 2 switch in a case that the failure of the LAG line occurs.

FIG. 14 is a diagram illustrating a comparative example of operations of the layer 2 switches 1a to 1f in a case that the failures of the LAG lines L11 and L12 occur. In FIG. 14, constituents common to those in FIG. 13 are denoted by the same reference numerals, and description thereof is omitted.

During the failure occurrence of the LAG lines L11 and L12 (see X mark), the packet transmitted from the packet switch 85 reaches the layer 2 switch 1a along a path Rd via the layer 2 switches 1c, 1d, and 1b. Since the failure is occurring in the LAG line L11, the layer 2 switch 1c may not transmit the packet received by the port a from the port b in the ACT state, and transmits the packet to the layer 2 switch 1d on the partner side of the redundant configuration from the port e through the IPL line L30.

The layer 2 switch 1d transmits the packet received by the port e from the port b in the SBY state to the layer 2 switch 1b through the LAG line L21. In this way, when the failure occurs in the LAG line L11 being the working line, the packet reaches the layer 2 switch 1b through the LAG line L21 being the spare line.

The layer 2 switch 1b transmits the packet received by the port a in the SBY state from the port e to the layer 2 switch 1a through the IPL line L31. At this time, the layer 2 switch 1b transmits the packet to the layer 2 switch 1a having the port b in the ACT state since the port a is in the SBY state.

However, since the failure is occurring in the LAG line L12, the layer 2 switch 1a may not transmit the packet from the port b in the ACT state, and also may not send back the packet to the layer 2 switch 1b through the IPL line L31. Therefore, the layer 2 switch 1a discards the packet without the ports a, b, and e capable of transmitting (see X mark).

The packet transmitted from the transfer network NW reaches the layer 2 switch 1a along a path Re via the layer 2 switches 1e, 1f, and 1b. Since the failure is occurring in the LAG line L12 being the working line in the same manner as the above description, the packet is transmitted via the LAG line L22 being the spare line.

The layer 2 switch 1a receives the packet from the layer 2 switch 1b through the IPL line L31, but discards the packet in the same manner as described above because there are no ports a, b, and e capable of transmitting (see X mark).

Since the ports a and b are in the SBY state, the layer 2 switch 1b transmits the packets received from the layer 2 switches 1d and 1f to the layer 2 switch 1a through the IPL line L31, so as to be transmitted from the ports a and b in the ACT state, respectively. The layer 2 switch 1b may not detect the failures of the LAG lines L11 and L12.

Therefore, in the embodiment, when the failures are occurring in the LAG lines L11 and L12, the ports a and b of the layer 2 switch 1a are switched from the ACT state to the SBY state, and the ports a and b of the layer 2 switch 1b are switched from the SBY state to the ACT state.

Figure 15:
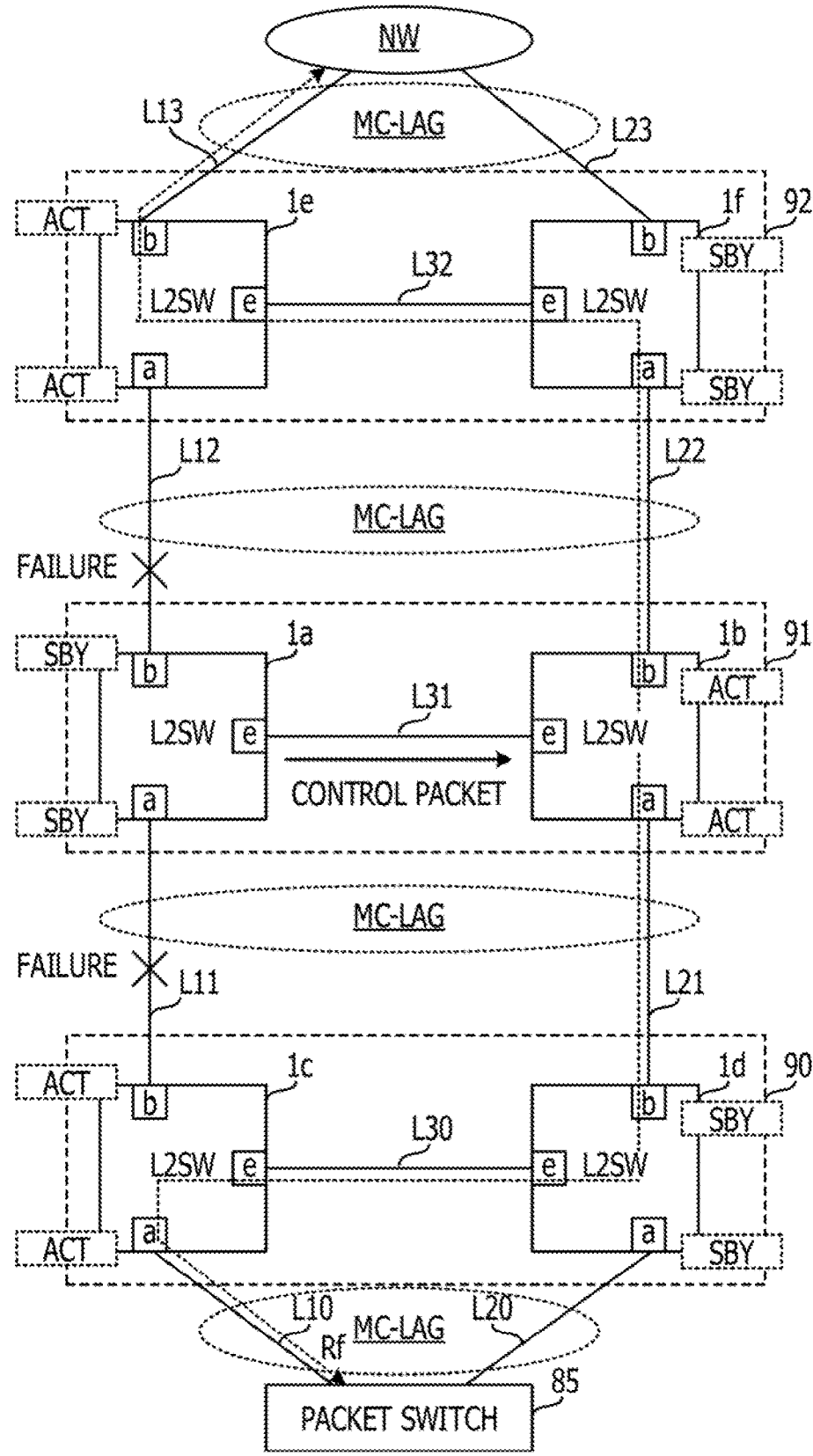
FIG. 15 is a diagram illustrating an embodiment of an operation of the layer 2 switch in a case that the failure of the LAG line occurs.

FIG. 15 is a diagram illustrating the embodiment of operations of the layer 2 switches 1a to 1f in a case that the failures of the LAG lines L11 and L12 occur. In FIG. 15, constituents common to those in FIG. 13 are denoted by the same reference numerals, and description thereof is omitted.

When the failures are occurring in the LAG lines L11 and L12, the layer 2 switch 1a switches the ports a and b from the ACT state to the SBY state, and transmits, to the layer 2 switch 1b on the partner side of the redundant configuration, a control packet including an instruction to switch the ports a and b from the SBY state to the ACT state. The layer 2 switch 1b switches the ports a and b from the SBY state to the ACT state in accordance with the instruction in the control packet.

With this, the layer 2 switch 1b transmits the packets received by the ports a and b in the ACT state from the ports b and a in the ACT state, respectively. At this time, the LAG lines L11 and L12 are switched from the working lines to the spare lines, and the LAG lines L21 and L22 are switched from the spare lines to the working lines.

Therefore, the packet switch 85 may transmit and receive the packet to and from the transfer network NW along a path Rf via the LAG lines L21 and L22 such that the packet bypasses the LAG lines L11 and L12 in each of which the failure is occurring. Therefore, the packet switch 85 and the transfer network NW may continue communication even during the failure occurrence of the LAG lines L11 and L12.

(Processing of State Switching Section 102)

The state switching section 102 switches the ports a and b to the ACT state or the SBY state based on the detection results of the failure detecting sections 104 and 105, respectively. The state switching section 102 transmits, to the layer 2 switch 1b on the partner side of the redundant configuration, a control packet for instructing switching of the states of the ports a and b through the switch device 14 and the port e. The state switching section 102 of the layer 2 switch 1b switches the ports a and b to the ACT state or the SBY state in accordance with the instruction in the control packet. The state switching section 102 is an example of a switching section.

Figure 16:
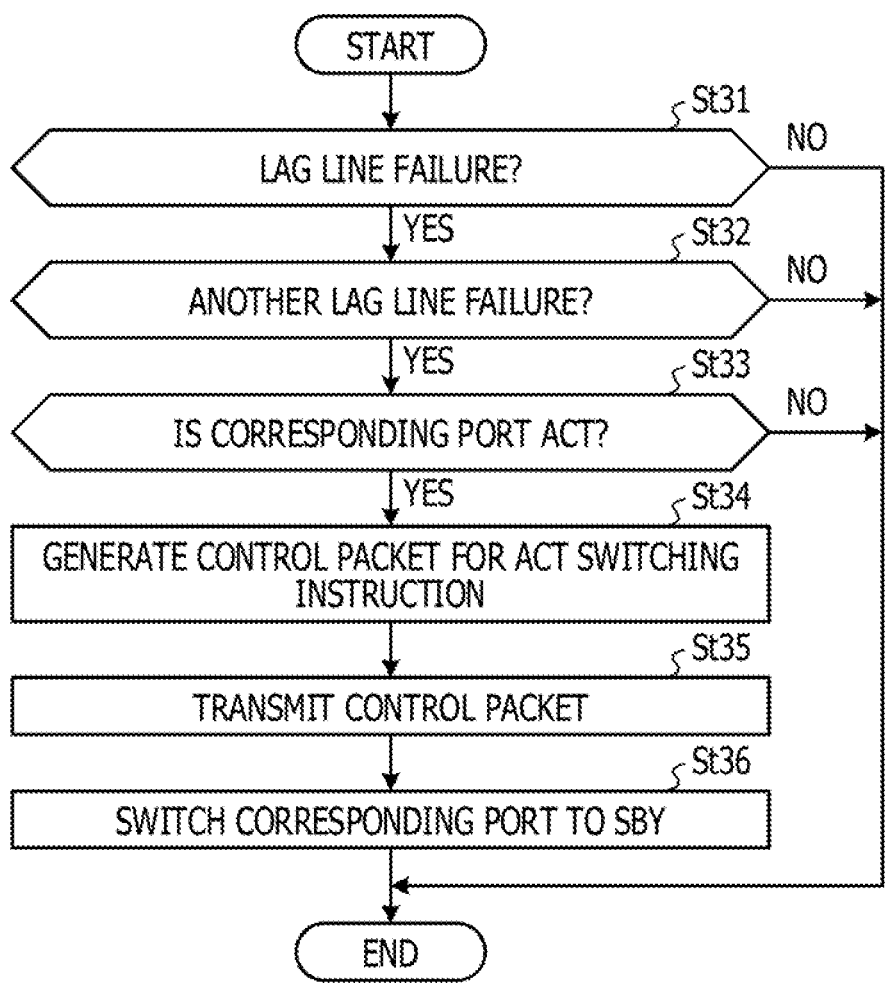
FIG. 16 is a flowchart illustrating an example of processing performed by a state switching section.

FIG. 16 is a flowchart illustrating an example of processing performed by the state switching section 102. In this example, processing of the state switching section 102 of the layer 2 switch 1a is described as an example, but the state switching section 102 of the other layer 2 switch 1b also performs the same processing as that of the layer 2 switch 1a.

The state switching section 102 determines the presence or absence of a failure in the LAG line L12 based on the detection result of the failure detecting section 104 (step St31). When no failure is occurring in the LAG line L12 (No in step St31), the state switching section 102 terminates the processing.

When the failure is occurring in the LAG line L12 (Yes in step St31), the state switching section 102 determines the presence or absence of the failure in the other LAG line L11 based on the detection result of the failure detecting section 105 (step St32). When no failure is occurring in the LAG line L11 (No in step St32), the state switching section 102 terminates the processing.

When the failure is occurring in the LAG line L11 (Yes in step St32), the state switching section 102 determines whether or not the ports a and b corresponding to the LAG lines L11 and L12 (corresponding ports) are in the ACT state (step St33). When the ports a and b are in the SBY state (No in step St33), the state switching section 102 terminates the processing.

When the ports a and b are in the ACT state (Yes in step St33), the state switching section 102 generates a control packet including an instruction for the layer 2 switch 1b to switch the ports a and b to the ACT state (step St34). Next, the state switching section 102 transmits the control packet from the port e to the layer 2 switch 1b through the switch device 14 (step St35).

Next, the state switching section 102 switches the ports a and b of the layer 2 switch 1a from the ACT state to the SBY state (step St36). The state switching section 102 switches the states of the ports a and b by changing the setting of the switch device 14, for example. By the ports a and b being switched from the ACT state to the SBY state, the LAG lines L11 and L12 are switched from the working lines to the spare lines. In this manner, the state switching section 102 executes the processing.

Figure 17:
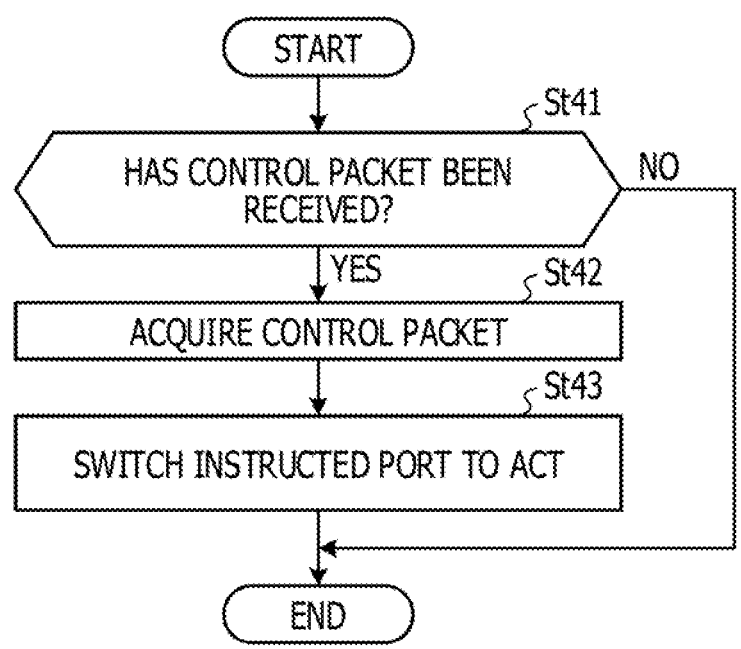
FIG. 17 is a flowchart illustrating an example of processing performed by the state switching section when a control packet is received.

FIG. 17 is a flowchart illustrating an example of processing performed by the state switching section 102 when the control packet is received. The state switching section 102 of the layer 2 switch 1b determines whether or not the port e has received the control packet (step St41). When the control packet has not been received (No in step St41), the state switching section 102 terminates the processing.

Next, when the port e has received the control packet (Yes in step St41), the state switching section 102 acquires the control packet from the switch device 14 (step St42). Next, the state switching section 102 switches the ports a and b instructed by the control packet from the SBY state to the ACT state (step St43).

By the ports a and b being switched from the SBY state to the ACT state, the LAG lines L21 and L22 are switched from the spare lines to the working lines. In this manner, the state switching section 102 executes the processing.

In this manner, when the failure detecting sections 104 and 105 detect the failures, respectively, the state switching section 102 of the layer 2 switch 1a switches the LAG lines L11 and L12 to the spare lines. At this time, the state switching section 102 further transmits, to the layer 2 switch 1b on the partner side of the redundant configuration through the IPL line L31, a control packet including an instruction to switch the LAG lines L21 and L22 to the working lines.

The state switching section 102 of the layer 2 switch 1b switches the LAG lines L21 and L22 to the working lines in accordance with the instruction of the control packet received by the port e.

Therefore, even when the layer 2 switch 1a may not transmit the packets from the ports a and b to the LAG lines L11 and L12, respectively, in each of which the failure is occurring, the layer 2 switch 1b on the partner side of the redundant configuration may transmit the packets from the ports a and b to the LAG lines L21 and L22, respectively. Accordingly, even after the failures of the LAG lines L11 and L12 occur, the communication may be continued.

According to the communication method described above, in the case that the ports a and b of the respective sets 90 to 91 of the layer 2 switches 1a to 1f are coupled by omitting the cross-coupling, the vulnerability of the network to the failures of the LAG lines L10 to L13 and L20 to L23 may be improved. Accordingly, in the layer 2 switches 1a to 1f, the number of ports used for MC-LAG may be reduced.

The above-described embodiment is a preferred embodiment. However, the embodiment is not limited to this, various modification may be made without departing from the scope of the disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication device redundantly configured with a first communication device, the communication device comprising:
   a first port configured to transmit a packet through a second communication line configuring link aggregation with a first communication line of the first communication device;

a second port configured to transmit and receive a packet through a fourth communication line configuring link aggregation with a third communication line coupled to a fifth port of the first communication device and a sixth port of a second communication device and coupled to a fourth port of a third communication device redundantly configured with the second communication device;
a third port configured to transmit a packet to the first communication device through a fifth communication line; and
a first processor coupled to the first port, the second port and the third port and configured to:
transfer a packet received by the second port to the first port or the third port;
detect a failure of the second communication line;
detect a failure of the fifth communication line; and
shut down the second port when detecting the failure of the second communication line and the failure of the fifth communication line,
wherein the packet is output to the second port through the fourth communication line from the fourth port of the third communication device when not detecting the failure of the second communication line and the failure of the fifth communication line.

2. The communication device according to claim 1, wherein the first processor is configured to:
transfer, when the failure of the second communication line is not detected, the packet received by the second port to the first port; and
transfer, when the failure of the second communication line is detected and the failure of the fifth communication line is not detected, the packet received by the second port to the third port.

3. The communication device according to claim 1, wherein
the fourth port is configured to transmit a packet to the second port through the fourth communication line;
a seventh port of the third communication device is configured to transmit a packet to the second communication device through a sixth communication line; and
the third communication device is configured to:
detect shutdown of the second port;
output, when the shutdown of the second port is not detected, a packet to the fourth port, and
output, when the shutdown of the second port is detected, a packet to the fifth port,
wherein the second communication device is configured to:
receive a packet from the third communication device through the sixth communication line; and
transfer the packet to the first communication device through the third communication line, and
wherein the first communication device is configured to:
receive a packet from the second communication device through the third communication line; and
transfer the packet to the first communication line.

4. The communication device according to claim 3, wherein the first processor is configured to:
transfer, when the failure of the second communication line is not detected, the packet received by the second port to the first port; and
transfer, when the failure of the second communication line is detected and the failure of the fifth communication line is not detected, the packet received by the second port to the third port.

5. A communication device redundantly configured with a first communication device, the communication device comprising:
a first port configured to transmit and receive a packet through a second communication line configuring link aggregation with a first communication line of the first communication device;
a second port configured to transmit and receive a packet through a fourth communication line configuring link aggregation with a third communication line coupled to a fifth port of the first communication device and a sixth port of a second communication device and coupled to a fourth port of a third communication device redundantly configured with the second communication device;
a third port configured to transmit and receive a packet to and from the first communication device through a fifth communication line;
a processor coupled to the first port, the second port and the third port and configured to:
transfer a packet among the first port, the second port, and the third port;
detect a failure of the second communication line;
detect a failure of the fourth communication line; and
switch the second communication line and the fourth communication line to spare lines when detecting the failure of the second communication line and the failure of the fourth communication line, and transmit, to the first communication device through the fifth communication line, a packet including an instruction to switch the first communication line and the third communication line to working lines,
wherein the packet is output to the second port through the fourth communication line from the fourth port of the third communication device when not detecting the failure of the second communication line and the failure of the fifth communication line.

6. A communication system comprising:
a first communication device and a second communication device that are redundantly configured,
wherein the first communication device includes:
a first transmission and reception port configured to transmit and receive a packet through a second communication line configuring link aggregation with a first communication line of the second communication device,
a second transmission and reception port configured to transmit and receive a packet through a fourth communication line configuring link aggregation with a third communication line of the second communication device,
a third transmission and reception port configured to transmit and receive a packet to and from the second communication device through a fifth communication line, and
a first processor configured to:
transfer a packet among the first transmission and reception port, the second transmission and reception port, and the third transmission and reception port,
detect a failure of the second communication line,
detect a failure of the fourth communication line, and
switch the second communication line and the fourth communication line to spare lines when the failure of the second communication line and the failure of the fourth communication line are detected, and transmit, to the second communication device through the fifth communication line, a packet including an instruction to switch the first communication line and the third communication line to working lines, wherein the packet is output to the second port through the fourth communication line from the fourth port of the third communication device when not detecting the failure of the second communication line and the failure of the fifth communication line, and the second communication device includes:
- a fourth transmission and reception port configured to transmit and receive a packet through the first communication line,
- a fifth transmission and reception port configured to transmit and receive a packet through the third communication line,
- a sixth transmission and reception port configured to transmit and receive a packet to and from the first communication device through the fifth communication line, and
- a second processor configured to:
  - transfer a packet among the fourth transmission and reception port, the fifth transmission and reception port, and the sixth transmission and reception port, and
  - switch the second communication line and the fourth communication line to the working lines in accordance with the instruction included in the packet received by the sixth transmission and reception port.

\* \* \* \* \*